United States Patent Office 2,940,995
Patented June 14, 1960

2,940,995
PROCESS FOR THE PRODUCTION OF ESTROGENIC OCTAHYDROPHENANTHRENE CARBOXYLIC ACIDS

Miroslav Protiva, No. 910 Novorosijska, and Jiří Jílek, No. 3 Krizovnicha, Prague, Czechoslovakia No Drawing. Filed July 31, 1957, Ser. No. 675,258

Claims priority, application Czechoslovakia Aug. 9, 1956

6 Claims. (Cl. 260—514.5)

U.S. patent application Ser. No. 594,664, now abandoned, describes new alicyclic lactones having the general formula

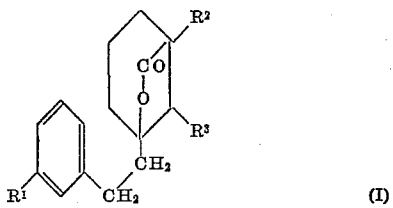

wherein $R^1$ is an alkoxy radical, particularly methoxy, $R^2$ the methyl group and $R^3$ a lower alkyl radical, particularly the ethyl group, $R^1$ being replaceable, if desired, by a hydroxyl group. These alicyclic lactones were to be used as intermediates for preparing some estrogenically active octahydrophenanthrene derivatives. A method of preparing such octahydrophenanthrene derivatives accordingly forms the main object of the present invention.

The invention is based on the determination that alicyclic lactones of the Formula (I) may be converted by heating with catalysts of the Friedel-Crafts type, such as with aluminum chloride, boron trifluoride or tin tetrachloride, in the presence of free hydrogen halogenides, into 1,2,3,4,9,10,11,12-octahydrophenanthrene-2-carboxylic acids of the general Formula (II), wherein $R^2$ and $R^3$ possess the same meaning as above, and $R^1$ signifies either an alkoxy radical, as above, or a hydroxyl group, since the original alkoxy group $R^1$ may in some cases be partially dealkylated during the reaction. The compounds in which $R^1$ is a hydroxyl group are also very estrogenically active and may be prepared in pure state and high yields by intentional dealkylation, e.g. by heating with pyridine hydrochloride.

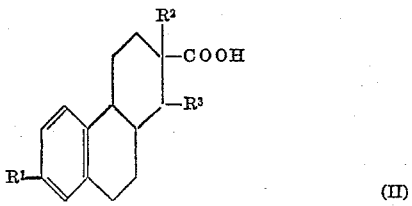

The reaction is advantageously carried out either in an appropriate non-polar solvent or without any solvent. The most advantageous embodiment of the present invention is the introduction of dry hydrogen chloride into a boiling solution of said alicyclic lactones in benzene with a catalyst suspended therein.

The reaction always yields a mixture of stereoisomeric acids of the Formula II, containing, in addition to compounds in which $R^1$ is an alkoxy radical, also dealkylated products in which $R^1$ is a hydroxyl group. In a further development of the present invention it has been found that such mixture may be resolved into its components by methylation, e.g. with dimethyl sulfate in an aqueous alkaline solution and then by heating it with excess diazomethane in ether solution, followed by vacuum fractionation. The methyl esters of the general Formula III, wherein the substituents possess the same meaning as in the Formulas I and II, may be vacuum distilled without decomposition. The mixture of

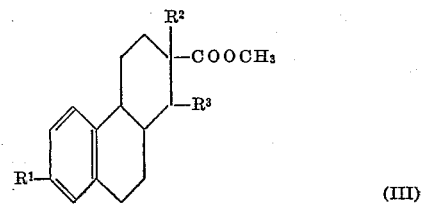

the methyl esters III may also be fractioned chromatographically.

The purified methyl esters (III) may be converted into free acids (II) by alkaline saponification under drastic conditions which are required because of the considerable steric protection of the carbomethoxyl in the esters (III). The best method consists in heating said methyl esters with excess potassium hydroxide, wetted with alcohol and water, at a temperature of 170–180° C. After dissolving the molten mass thus formed and removing the undissolved neutral components, the acids (II) are precipitated by acidification with an inorganic acid, such as hydrochloric acid. The purified products thus obtained are as yet amorphous and possess a comparatively low melting point, so that they cannot be directly recrystallized. For further fractionation it is possible to utilize the different solubility of the sodium salts in water or in moderately alkaline aqueous solutions, such as in an aqueous sodium carbonate solution. In this way it is possible to obtain crystalline sodium salts of the acids (II), which may be worked up by acidification and usual further treatment to crystalline and stereochemically uniform acids (II).

As mentioned above, a partial dealkylation occurs during the isomerization of the lactones (I) to acids (II), if $R^1$ is an alkoxy group. The dealkylation products are also very interesting and may be prepared in pure form by intentional dealkylation by heating them with a hydrochloride of a nitrogen base, such as of pyridine.

1,2,3,4,9,10,11,12 - octahydrophenanthrene - 2 - carboxylic acids of the Formula II possess high biological activity of the female hormone type. Some compounds of this series even surpass in their estrogenic activity natural female hormones, e.g. estradiol and estrone; in comparison with them, however, they possess the advantage of equal effectiveness both in parenteral and oral application. They may therefore be utilized in treating some hormonal disturbances or other diseases where estrogens are usually dispensed.

*Example 1*

Gaseous dry hydrogen chloride is introduced into a boiling suspension of 30 grams of anhydrous aluminum chloride in 240 cc. of dry thiophene-free benzene. Simultaneously a solution of 10.0 grams of lactone of 1-(2-m-methoxy phenylethyl)-2-ethyl-3 methylcyclohexanol-3-carboxylic acid in an additional 150 cc. of benzene is added dropwise during one hour while stirring. Thereafter the reaction mixture is heated and saturated with hydrogen chloride for an additional 90 minutes. The mixture is then left standing overnight. Then 300 millilitres of 3 N-hydrochloric acid are dropped in while stirring and cooling with ice. The precipitate is sucked off and washed with water. After drying over phosphoric anhydride the yield of the raw acid amounts to 8.0 grams. The product melts not sharp at 80–95° C.

The raw acid mixture thus obtained is dissolved in 50 cc. of ether and it is then methylated with an ether solution of diazomethane, which is formed from 30 grams of N-nitroso-p-toluene sulfomethylamide according to De Boer and Backer (Rec. trav. chim. 73, 233, 1954). The mixture is left standing overnight and then the excess of diazomethane is decomposed by adding 7 millilitres of glacial acetic acid drop by drop. The solution is filtered through a column of 50 grams of aluminum oxide and the filtrate is evaporated. The residue is 8.23 grams of raw methyl esters of the methoxy- and hydroxy acids mixture. By vacuum distillation from a Hickman still one obtains 6.4 grams of a fraction boiling at 190–205° C./0.1–0.2 mm. Hg; according to the elementary analysis this fraction consists mainly of the methyl esters of the methoxy acids (III), contaminated with a minor amount of methyl esters of the hydroxy acids. The fraction is dissolved in 100 millilitres of ether and the solution is extracted by shaking it two times, each time with 30 millilitres of ten percent potassium hydroxide solution in order to remove compounds with a free phenolic group. The alkaline extract is then methylated by heating with 10 grams of dimethyl sulfate on a water-bath for three hours while stirring. From the obtained reaction mixture a further amount of methoxy acid methyl ester is recovered in usual manner.

The ether solution containing 6.1 grams of a mixture of methyl esters (III) is evaporated and the residue is chromatographed on a 200 grams neutral alumina column (activity II). The main fraction is eluated with a petroleum ether-benzene mixture (1:1). It may be redistilled, if desired. Its boiling point is 185° C. at 0.1 mm. Hg pressure.

2.0 grams of the product are dissolved in 8 millilitres of ethanol and the solution is added to a mixture of 8 grams of potassium hydroxide with 4 millilitres of water. The whole is heated in an open vessel on an oil-bath at such a rate that the temperature reaches 170–180° C. during about 20 minutes. Then the mixture is partially cooled down, 6 millilitres of ethanol are added and the whole is heated again until all the ethanol is evaporated and the temperature of the oil-bath again reaches 170–180° C. The heating with ethanol is repeated a total of four times. After having been cooled down the product is dissolved in 150 millilitres of water and the solution is purified by extracting it with 100 millilitres of ether. After having distilled off the ether dissolved in the aqueous layer, the latter is filtered with active charcoal, cooled down to 5° C. and acidified with concentrated hydrochloric acid added dropwise while stirring. The precipitate thus formed is sucked off, washed with water and dissolved in 80 millilitres of five percent sodium carbonate solution under slight warming. By cooling, the bulk of the product crystallizes as pure sodium salt of one stereoisomer of 1-ethyl-2-methyl-7-methoxy-1,2,3,4,9,10,11,12 - octahydrophenanthrene - 2 - carboxylic acid. The free acid, obtained from an aqueous solution of the salt by acidification, is recrystallized from methanol; it melts at 190–191° C. (in Kofler block). This acid, showing high estrogenic activity, has the structural formula

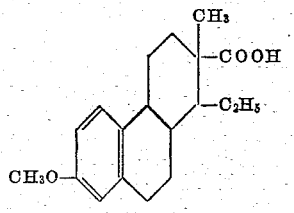

300 milligrams of this acid are demethylated by heating with 3.0 grams of pyridine hydrochloride for 4.5 hours at 170–190° C. After having been cooled down the mixture is leached with 30 cc. of 3 N-hydrochloric acid and after 12 hours the precipitate is separated by filtration and recrystallized from ethanol. It melts somewhat unsharply at about 116° C. and also possesses high estrogenic activity. It is the semihydrate of 1-ethyl-2-methyl - 7 - hydroxy-1,2,3,4,9,10,11,12-octahydrophenanthrene-2-carboxylic acid having the following structural formula:

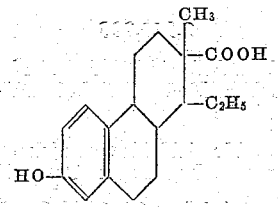

Example 2

Dry hydrogen chloride is introduced into a boiling suspension of 29 grams of anhydrous aluminum chloride in 250 millilitres of dry, thiophene-free benzene, and a solution of 10.0 grams of lactone of 1-(2-m-methoxyphenylethyl)- 2 - ethyl-3-methylcyclohexanol-3-carboxylic acid in an additional 130 millilitres of benzene are added simultaneously drop by drop during 20 minutes. Then the mixture is kept boiling under reflux under constant saturation with dry hydrogen chloride for one hour, and finally the saturation with hydrogen chloride is maintained for another hour at room temperature. The reaction mixture is then left standing overnight.

The next day 300 millilitres of 3 N-hydrochloric acid are slowly added while stirring and cooling and the whole is left standing overnight again. The separated benzene layer is shaken out with 600 millilitres of five percent sodium hydroxide. The alkaline solution thus obtained is freed from some precipitate and mixed with 20 grams of sodium hydroxide. After dissolving the latter, 50 millilitres of dimethyl sulfate are added and the mixture is heated for an hour on a boiling water-bath while stirring. After having been cooled down the solution is acidified under constant stirring with concentrated hydrochloric acid and the precipitate is extracted by shaking out with ether. The ether solution is dried with anhydrous sodium sulfate and evaporated. The residue, obtained in an amount of 9.0 grams, is dissolved in 50 millilitres of ether, and into this solution a mixture of ether and diazomethane is distilled, this mixture being formed from 2.5 grams of N-nitroso-p-toluene sulfomethylamide according to De Boer and Backer (see above). The reaction mixture is kept overnight, the excess of diazomethane is decomposed with glacial acetic acid (4.5 millilitres) and the ether is distilled off. The residue, obtained in an amount of 9.2 grams, is vacuum distilled from a Hickman still. There are thus obtained 6.1 grams of methyl esters of stereoisomeric 1-ethyl-2-methyl - 7 - methoxy-1,2,3,4,9,10,11,12-octahydrophenanthrene-2-carboxylic acids, melting at 180–195° C./0.1–0.2 mm. Hg.

The whole amount of this product is saponified with 24 grams of potassium hydroxide in the manner described in Example 1. 5.6 grams of raw free methoxy acids are obtained by acidification, melting at 50–60° C. The product is dissolved, as in the foregoing example, in a soda solution in order to obtain the crystalline sodium salt of a stereoisomer. The salt yields by acidification free 1 - ethyl-2-methyl-7-methoxy-1,2,3,4,9,10,11,12-octahydrophenanthrene-2-carboxylic acid, melting at 189–190° C., identical with the product according to Example 1.

Some inorganic halogenides of the class of Friedel-Crafts catalysts, easily form free hydrogen halogenides in contact with traces of humidity, e.g. in contact with water vapors contained in the air. An intentional addition of free hydrogen halogenides is thus superfluous, if a sufficient amount of such a catalyst is used. The expression "in the presence of free hydrogen halogenide" used above and in the following claims does not mean, in consequence, that hydrogen halogenide must be always introduced as such.

What is claimed is:
1. In a method of producing compounds having the following general Formula I:

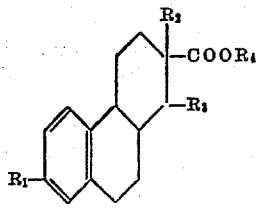

wherein $R_1$ is selected from the group consisting of hydroxyl and methoxy; wherein $R_2$ is methyl, wherein $R_3$ is ethyl, and wherein $R_4$ is hydrogen, the step of heating an alicyclic lactone of the following general Formula II:

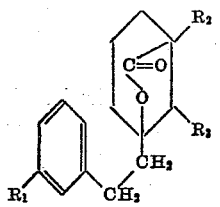

wherein $R_1$ is a methoxy group, and wherein $R_2$ and $R_3$ have the same definition as above with a catalyst of the Friedel-Crafts type in the presence of a free hydrogen halide.

2. In a method of producing compounds having the following general Formula I:

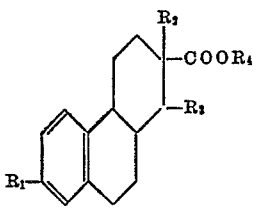

wherein $R_1$ is selected from the group consisting of hydroxyl and methoxy, wherein $R_2$ is methyl, wherein $R_3$ is ethyl, and wherein $R_4$ is hydrogen, the step of heating an alicyclic lactone of the following general Formula II:

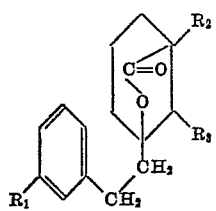

wherein $R_1$ is a methoxy group, and wherein $R_2$ and $R_3$ have the same definition as above with a catalyst of the Friedel-Crafts type selected from the group consisting of aluminum chloride, boron trifluoride and tin tetrachloride in the presence of a free hydrogen halide.

3. In a method of producing a compound having the following general Formula I:

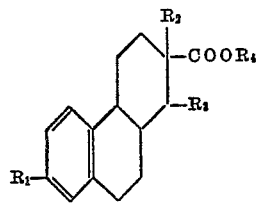

wherein $R_1$ is hydroxyl, wherein $R_2$ is methyl, wherein $R_3$ is ethyl, and wherein $R_4$ is hydrogen, the step of heating an alicyclic lactone of the following general Formula II:

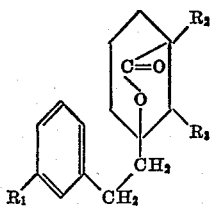

wherein $R_1$ is methoxy, and wherein $R_2$ and $R_3$ have the same definition as above with a catalyst of the Friedel-Crafts type selected from the group consisting of aluminum chloride, boron trifluoride and tin tetrachloride in the presence of a free hydrogen halide so as to form a mixture of compounds of Formula I wherein $R_1$ is methoxy and wherein $R_1$ is hydroxyl; and de-alkylating the thus formed compound wherein $R_1$ is methoxy by heating the same with pyridine hydrochloride so as to form the compound of Formula I wherein $R_1$ is hydroxyl.

4. In a method of producing a mixture of compounds having the following general formula I:

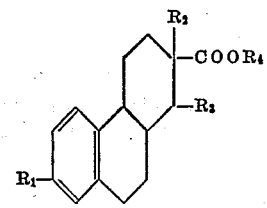

wherein $R_1$ is hydroxyl and wherein $R_1$ is methoxy, wherein $R_2$ is methyl, wherein $R_3$ is ethyl, and wherein $R_4$ is hydrogen, the step of heating an alicyclic lactone of the following general Formula II:

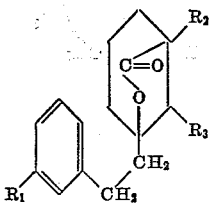

wherein $R_1$ is a methoxy group, and wherein $R_2$ and $R_3$ have the same definition as above dissolved in a nonpolar solvent with a catalyst of the Friedel-Crafts type selected from the group consisting of aluminum chloride, boron trifluoride and tin tetrachloride in the presence of a free hydrogen halide.

5. In a method of producing a compound having the following general Formula I:

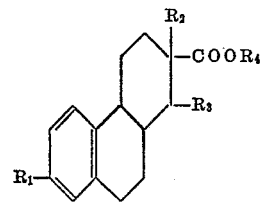

wherein $R_1$ is methoxy, wherein $R_2$ is methyl, wherein $R_3$ is ethyl, and wherein $R_4$ is hydrogen, the step of heating an alicyclic lactone of the following general Formula II:

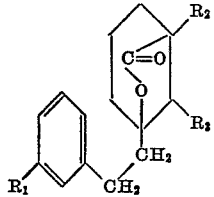

wherein $R_1$ is a methoxy group, and wherein $R_2$ and $R_3$ have the same definition as above with a catalyst of the Friedel-Crafts type in the presence of a free hydrogen halide so as to form a reaction mixture including a mixture of said compound of Formula I wherein $R_4$ is hydrogen and wherein $R_1$ is hydroxyl and said compound of Formula I wherein $R_4$ is hydrogen and wherein $R_1$ is methoxy; methylating said compounds of Formula I wherein $R_4$ is hydrogen and wherein $R_1$ is hydroxyl to the corresponding compounds of Formula I wherein $R_4$ is methyl and wherein $R_1$ is methoxy so as to form a reaction mass consisting essentially of the corresponding methoxy methyl ester; fractionating said methoxy methyl esters by vacuum distillation; saponifying the obtained fractions with potassium hydroxide at elevated temperature; and converting the thus obtained saponified products into the free acids by acidification.

6. In a method of producing a compound having the following general Formula I:

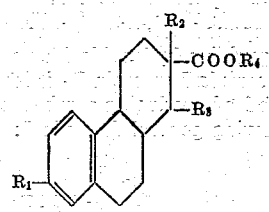

wherein $R_1$ is methoxy, wherein $R_2$ is methyl, wherein $R_3$ is ethyl, and wherein $R_4$ is hydrogen, the step of heating an alicyclic lactone of the following general Formula II:

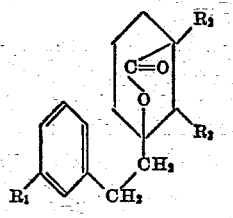

wherein $R_1$ is a methoxy group, and wherein $R_2$ and $R_3$ have the same definition as above with a catalyst of the Friedel-Crafts type in the presence of a free hydrogen halide so as to form a reaction mixture including a mixture of said compound of Formula I wherein $R_4$ is hydrogen and wherein $R_1$ is hydroxyl and said compound of Formula I wherein $R_4$ is hydrogen and wherein $R_1$ is methoxy; methylating said compounds of Formula I wherein $R_4$ is hydrogen and wherein $R_1$ is hydroxyl to the corresponding compounds of Formula I wherein $R_4$ is methyl and wherein $R_1$ is methoxy so as to form a reaction mass consisting essentially of the corresponding methoxy methyl esters, fractioning said methoxy methyl esters by chromatography; saponifying the obtained fractions with potassium hydroxide at elevated temperature; converting the thus obtained saponified products into the free acids by acidification; converting said free acids into the corresponding sodium salts thereof; recrystallizing said sodium salts from aqueous solution; and isolating free acids by acidification.

References Cited in the file of this patent
UNITED STATES PATENTS

| | | |
|---|---|---|
| 2,459,834 | Miescher et al. | Jan. 25, 1949 |
| 2,534,466 | Miescher et al. | Dec. 19, 1950 |
| 2,663,716 | Johnson et al. | Dec. 22, 1953 |
| 2,732,389 | Hogg | Jan. 24, 1956 |